United States Patent [19]

Mahadevan et al.

[11] Patent Number: 5,797,013
[45] Date of Patent: Aug. 18, 1998

[54] INTELLIGENT LOOP UNROLLING

[75] Inventors: Uma Mahadevan, Sunnyvale; Lacky Shah, Fremont, both of Calif.

[73] Assignee: Hewlett-Packard Company, Palo Alto, Calif.

[21] Appl. No.: 564,514

[22] Filed: Nov. 29, 1995

[51] Int. Cl.$^6$ ............................................. G06F 9/45
[52] U.S. Cl. ............................ 395/709; 395/588
[58] Field of Search ........................ 395/705, 709, 395/588, 580

[56] References Cited

U.S. PATENT DOCUMENTS

| | | | |
|---|---|---|---|
| 5,265,253 | 11/1993 | Yamada | 395/700 |
| 5,367,651 | 11/1994 | Smith et al. | 395/700 |
| 5,386,562 | 1/1995 | Jain et al. | 395/650 |

OTHER PUBLICATIONS

"A Comparative Evaluation of Software Techniques to Hide Memory Latency", John et al., Proc. of the 28$^{th}$ Ann. Hawaii Int'l Conf., 1995, pp. 229–238.

"Schedule driven Loop Unrolling for Parallel Processors", System Sciences, 1991 Annual Hawaii Int'l Conference, 1991, vol. II pp. 458–467.

"Aggressive Loop Unrolling in a Retargetable, Optimizing Compiler", Davidson et al., Dept of Comp. Science, Univ. of Va. pp. 1–14.

"Unrolling Loops in Fortran," Dongarra et al., Soft. Practice and Experience, vol. 9, 1979, pp. 219–226.

Hendren et al., "Designing Programming Languages for the Analyzability of Pointer Data Structures," Comput. Lang., vol. 19, No. 2, pp. 119–134 (1993).

Weiss et al., "A Study of Scalar Compilation Techniques for Pipelined Supercomputers," ACM, pp. 105–109 (1987).

*Primary Examiner*—Emanuel Todd Voeltz
*Assistant Examiner*—Kakali Chaki

[57] ABSTRACT

A compiler facilitates efficient unrolling of loops and enables the elimination of extra branches from the loops, including the elimination of conditional branches from unrolled loops with early exits. Unrolling also enhances other optimizations, such as prefetch, scalar replacement, and instruction scheduling. The unroll factor is calculated to determine the amount of loop expansion and the optimum location to place compensation code to complete the original loop count, i.e. before or after the unrolled loop. The compiler is applicable, for example, to modern RISC architectures, where the latency of memory references and branches is higher than that of integer and floating point arithmetic instructions.

16 Claims, 13 Drawing Sheets

```
        I = N
BEGIN_LOOP:
    ┌─────────────────────────────┐
    │ A[I] = B[I] + X             │
    │ I = I - 1                   │
    │ IF (I>0) GOTO BEGIN_LOOP;   │
    └─────────────────────────────┘
END_LOOP:

PRINT I
```

Fig. 3 (PRIOR ART)

```
I = N
BEGIN_LOOP:
    ┌──────────────────┐  ← 401
    │ A[I] = B[I] + K  │
    │ I = I - 1        │
    └──────────────────┘
    IF ( I < 0) GOTO END_LOOP   ← 403
    ┌──────────────────┐  ← 405
    │ C[I] = A[I] + X  │
    └──────────────────┘
    GOTO BEGIN_LOOP
END_LOOP:

PRINT I
```

Fig. 7a (PRIOR ART)

```
BEGIN_LOOP:
    ┌──────────────────────┐
    │ A[I] = A[I-2] / B[I] │
    │ I = I + 1;           │
    └──────────────────────┘
    IF (I < N) GOTO BEGIN_LOOP
END_LOOP:
```

Fig. 9 (PRIOR ART)

```
                                    ─301
I = N
IF (I<4) GOTO BEGIN_COMPENSATION_LOOP
UNROLLED_LOOP:
```

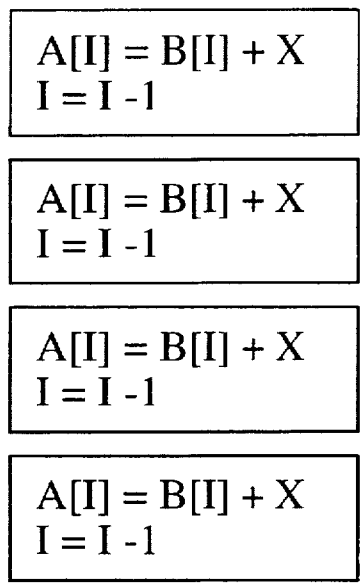
```
                        ─333
            IF (I >= 4) GOTO UNROLLED_LOOP    ─159
END_UNROLLED_LOOP:
                                              ─303
IF (I = 0) GOTO END_COMPENSATION_LOOP
BEGIN_COMPENSATION_LOOP:

┌─────────────────────────────────────────────┐
    │ A[I] = B[I] + X                             │
    │ I = I -1                                    │
    │ IF (I>0) GOTO BEGIN_COMPENSATION_LOOP;      │
    └─────────────────────────────────────────────┘
                                              ─155
END_COMPENSATION_LOOP:
PRINT I
```

Fig. 4
(PRIOR ART)

```
I = N
J = ( (N-1) %) 4 + 1        NOTE: ( (N-=1)  MOD 4) + 1
I = N - J ; NOTE THAT I IS GUARANTEED
TO BE DIVISIBLE BY 4 HERE.                    ← 320
COMPENSATION_LOOP:
```

```
A[J] = B[J] + X
J = J -1
IF (J > 0) GOTO BEGIN_COMPENSATION_LOOP:
```
← 383

```
END_COMPENSATION_LOOP:
IF (I = 0) GOTO END_UNROLLED_LOOP
    UNROLLED_LOOP:
```

```
A[I] = B[I] + X
I = I -1
```

```
A[I] = B[I] + X
I = I -1
```
347

```
A[I] = B[I] + X
I = I -1
```

```
A[I] = B[I] + X
I = I -1
```

```
    IF (I > 0) GOTO UNROLLED_LOOP
  END_UNROLLED_LOOP:
PRINT I
```

Fig. 6

```
                                                              ⟵ 311
    I = N
    IF (I < 5) GOTO BEGIN_COMPENSATION_LOOP
    UNROLLED_LOOP:
```
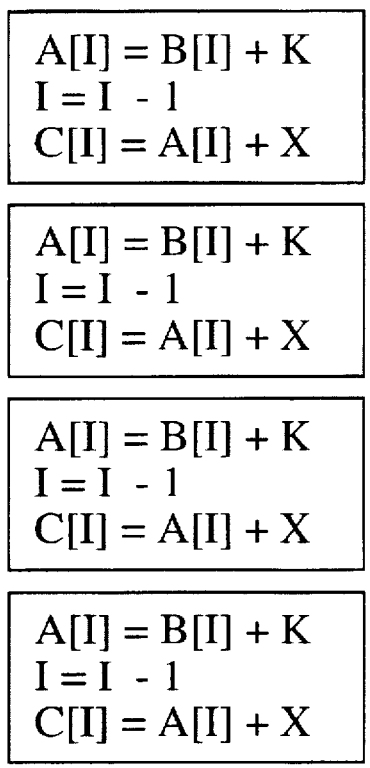
```
          IF (I >= 5) GOTO UNROLLED_LOOP;       ⟵ 312
    END_UNROLLED_LOOP:
    BEGIN_COMPENSATION_LOOP:
```
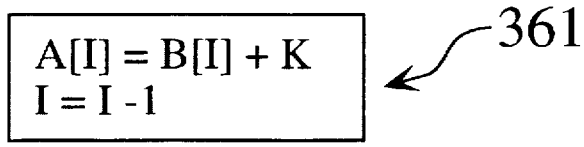
```
    IF (I < 0) GOTO END_COMPENSATION_LOOP;      ⟵ 365
```
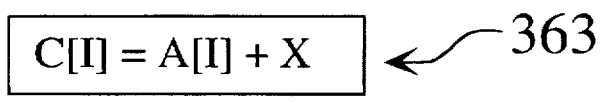
```
          GOTO BEGIN_COMPENSATION_LOOP
    END_LOOP:
    PRINT I
```
Fig. 8

INTELLIGENT LOOP UNROLLING

BACKGROUND OF THE INVENTION

1. Technical Field

The invention relates to compilers. More particularly, the invention relates to techniques for unrolling computation loops in a compiler so as to generate code which executes faster.

2. Description of The Prior Art

FIG. 1 is a block schematic diagram of a uniprocessor computer architecture, including a processor cache. In the figure, a processor 11 includes a cache 12 which is in communication with a system bus 15. A system memory 13 and one or more I/O devices 14 are also in communication with the system bus.

FIG. 2a is a block schematic diagram of a software compiler 20, for example as may be used in connection with the computer architecture shown in FIG. 1. The compiler Front End component 21 reads a source code file (100) and translates it into a high level intermediate representation (110). A high level optimizer 22 optimizes the high level intermediate representation 110 into a more efficient form. A code generator 23 translates the optimized high level intermediate representation to a low level intermediate representation (120). The low-level optimizer 24 converts the low level intermediate representation (120) into a more efficient (machine-executable) form. Finally, an object file generator 25 writes out the optimized low-level intermediate representation into an object file (141). The object file (141) is processed along with other object files (140) by a linker 26 to produce an executable file (150), which can be run on the computer 10. In the invention described herein, it is assumed that the executable file (150) can be instrumented by the compiler (20) and linker (26) so that when it is run on the computer 10, an execution profile (160) may be generated, which can then be used by the low level optimizer 24 to better optimize the low-level intermediate representation (120). The compiler 20 is discussed in greater detail below.

The compiler is the piece of software that translates source code, such as C, BASIC, or FORTRAN, into a binary image that actually runs on a machine. Typically the compiler consists of multiple distinct phases, as discussed above in connection with FIG. 2a. One phase is referred to as the front end, and is responsible for checking the syntactic correctness of the source code. If the compiler is a C compiler, it is necessary to make sure that the code is legal C code. There is also a code generation phase, and the interface between the front-end and the code generator is a high level intermediate representation. The high level intermediate representation is a more refined series of instructions that need to be carried out. For instance, a loop might be coded at the source level as:

$for(I=0, I<10, I=I+1),$ which might in fact be broken down into a series of steps, e.g. each time through the loop, first load up I and check it against 10 to decide whether to execute the next iteration.

A code generator takes this high level intermediate representation and transforms it into a low level intermediate representation. This is closer to the actual instructions that the computer understands. An optimizer component of a compiler must preserve the program semantics (i.e. the meaning of the instructions that are translated from source code to an high level intermediate representation, and thence to a low level intermediate representation and ultimately an executable file), but rewrites or transforms the code in a way that allows the computer to execute an equivalent set of instructions in less time.

Modern compilers are structured with a high level optimizer (HLO) that typically operates on a high level intermediate representation and substitutes in its place a more efficient high level intermediate representation of a particular program that is typically shorter. For example, an HLO might eliminate redundant computations. With the low level optimizer (LLO), the objectives are the same as the HLO, except that the LLO operates on a representation of the program that is much closer to what the machine actually understands.

FIG. 2b is a block diagram showing a low level optimizer for a compiler, including a loop unrolling component 30 according to the invention. The low level optimizer 24 may include any combination of known optimization techniques, such as those that provide for local optimization 35, global optimization 36, loop identification 37, loop invariant code motion 38, prefetch 34, register reassociation 31, and instruction scheduling 32.

Source programs translated into machine code by compilers consists of loops, e.g. DO loops, FOR loops, and WHILE loops. Optimizing the compilation of such loops can have a major effect on the run time performance of the program generated by the compiler. In some cases, a significant amount of time is spent doing such bookkeeping functions as loop iteration and branching, as opposed to the computations that are performed within the loop itself. These loops often implement scientific applications that manipulate large arrays and data instructions, and run on high speed processors.

This is particularly true on modern processors, such as RISC architecture machines. The design of these processors is such that in general the arithmetic operations operate a lot faster than memory fetch operations. This mismatch between processor and memory speed is a very significant factor in limiting the performance of microprocessors. Also, branch instructions, both conditional and unconditional, have an increasing effect on the performance of programs. This is because most modern architectures are superpipelined and have some sort of a branch prediction algorithm implemented. The aggressive pipelining makes the branch misprediction penalty very high. Arithmetic instructions are interregister instructions that can execute quickly, while the branch instructions, because of mispredictions, and memory instructions such as loads and stores, because of slower memory speeds, can take a longer time to execute.

Modern compilers perform code optimization. Code optimization consists of several operations that improve the speed and size of the complied code, while maintaining semantic equivalence. Common optimizations include:

prefetching data so that they are available in cache memory when needed;

detecting calculations as computing constants and performing the calculation at compile time;

scalar replacement which keeps the value of a variable in a register within the loop;

moving calculations outside of loops where possible; and performing code scheduling, which consists of rearranging the order of and modifying instructions to achieve faster running but semantically equivalent code.

Many modern compilers also employ an optimizing technique known as loop unrolling to generate faster running code. In its essence, loop unrolling takes the inner loop, i.e. the code between the beginning and the end of the loop, and repeats it in the inner loop some number of times, e.g. four times. It then executes the unrolled loop one-fourth as many times as it would have executed the original loop. The number of times the loop is replicated within the unrolled loop is called the unroll factor. Because the number of times the original loop is executed is not always divisible by the unroll factor, a compensation loop code often has to be generated to execute the remaining of instructions of the original loop that are not executed by the unrolled loop.

As discussed above, such loops as DO, FOR and WHILE loops are common in programs, especially in scientific and other time-consuming programs. Frequently 80% of the running time of a program can be in a few small loops. As a result anything that can speed up such loops is of great value in making a more efficient compiler.

Consider the simple loop shown on FIG. 3. The three instructions in the inner loop 150 are executed N times. According to the prior art, this loop can be unrolled with an unroll factor of four to produce the code shown on FIG. 4, where the inner loop (less the exit condition) is replicated 4 times 333. This loop is also followed by a test 303 to see if the full original loop has been completed, and a compensation loop 155 which is executed to the complete the original loop trip count if it has not been completed.

An inspection of the loop shows that it is semantically equivalent to the loop of FIG. 3 because the same function is performed and the same result is achieved. However, the loop of FIG. 4 runs much faster for several reasons. First, the conditional branch 159 which exits the loop is executed only once for each time through the unrolled loop rather than once for each time through the original loop. Assuming an unroll factor of four as is shown here, this saves ¾ of a conditional branch per original loop iteration. More importantly, other compiler optimizations interact with loop unrolling and are able to do a much better job of optimizing the unrolled loop, such as that identified by numeric designator 333, as compared to the original loop, identified by numeric designator 150. In an unrolled loop, there are more operations that could be scheduled in parallel, more opportunity to do scalar replacement and other optimizations, and more possibilities to do prefetching.

The tests identified by numeric designators 301 and 303 are also of interest. These are the conditional branches which have a higher probability of being mispredicted. Anything that can be done to eliminate one of them will be very useful.

Prior art loop unrolling techniques have certain disadvantages. For example, J. J. Dongara and A. R. Hinds, *Unrolling Loops in FORTRAN*, describes how one can unroll loops manually by duplicating code. This is an early solution to optimizing code that it is not even implemented by the compiler.

S. Weiss and J. E. Smith, *A Study of scalar compilation techniques for pipeline supercomputers*, discuss unrolling in the compiler. Here the authors address the simple situations:
a) Cases where the loop count is known at compile time. They do not address loop unrolling when the loop count is only known at run time.
b) Cases where the loop exit appears only at the beginning or end of the loop. They do not address the situation of unrolling loops with early exits (loops whose exit may occur in the middle of the loop).

The authors do not address the following issues:
a) Determining whether to place the compensation code before or after the unrolled loop.
b) Tuning of the iteration count to reduce branch misprediction.
c) Factors that affect the unroll factor.

L. J. Hendren and G. R. Gao, *Designing Programming Languages for the Analyzability of Pointer Data Structures*, addresses the issue of unrolling loops as part of compiler optimization. They do not however discuss:
a) Unrolling loops with early exits;
b) Tuning of the iteration count to reduce branch misprediction;
c) Factors that affect the unroll factor;
d) Whether to place a compensation code at the beginning or end of the loops; and
e) Compiling loops whose trip count is only known at run time.

J. Davidson, S. Jinturkar, *Aggressive Loop Unrolling in a Retargetable, Optimizing Compiler*, Dept. of Computer Science, Thornton Hall, University of Virginia disclose a code transformation, referred to as aggressive loop unrolling, in a retargetable optimizing compiler where the loop bounds are not known at compile time. Various factors were analyzed to determine how and when loop unrolling should be applied, resulting in an algorithm for loop unrolling in which execution-time counting loops (i.e. a counting loop whose iteration count is not trivially known at compile time) are unrolled and loops having complex control-flow are unrolled. However, they do not discuss:
a) Unrolling loops having early exits;
b) Tuning of the iteration count to reduce branch misprediction
c) Factors that affect the unroll factor; and
d) Whether to place a compensation code at the beginning or end of the loops.

Another part of the loop unrolling prior art is shown on FIG. 7, which illustrates a loop having an early exit (also referred to as a WHILE loop), consisting of an exit test and branch 403 in the middle of the loop between computations 401 and 405. According to the prior art, the code, including the exit 403, is replicated four times in an unrolled loop. The number of branches in the loop are however not reduced with this optimization.

While some of the techniques discussed in the prior art are applicable to compilers for all computers, only some of them are particularly applicable for modern RISC computers, where branch instructions form a lot bigger bottleneck than in earlier technologies. Also compilers for RISC architectures are a lot more aggressive and the interactions of various optimizations plays a key role in the quality of the final code.

SUMMARY OF THE INVENTION

The invention provides a new compiler that can unroll more loops than previous algorithms. It also significantly reduces the number of branch instructions by cleverly handling the iteration count and by converting loops with early exits to regular FOR loops. The invention also provides for computing the unroll factor and the placement of the compensation loop by taking a lot of other optimizations into consideration.

The compiler:

Eliminates time consuming conditional branch instructions from the compensation code loop by replacing the conditional exit of the main unrolled loop to always exit with at least one iteration which has yet to be executed by the compensation code. This eliminates the need to test for zero remaining loops.

Determines whether it is better to place the compensation code at the beginning or the end of the unrolled loop according to which one would likely provide the better optimization. Generally, it prefers to put the compensation loop in front of the main loop if the unroll factor is a power of two and after the main loop if the unroll factor is not a power of two.

Computes the unroll factor by taking into account the interactions of other optimizations like prefetch, scalar replacement and register allocation, and also taking into account hardware features like number of functional units. Unrolling loops over-aggressively or under-aggressively can inhibit other optimizations or make them less effective.

Converts loops with early exit to loops with exit at the end to apply more efficient optimizations to the loop. It does this by ensuring that the compensation code is always executed at least once, enabling the compiler to eliminate the exit tests from the unrolled loop.

BRIEF DESCRIPTION OF THE DRAWINGS

FIG. 3 shows a simple program loop;

FIG. 4 shows the loop of FIG. 3 that has been unrolled four times according to the prior art;

FIG. 6 shows an unrolled loop having pre-loop compensation code;

FIG. 7a shows a simple WHILE loop;

FIG. 8 shows the WHILE loop of FIG. 7a that has been unrolled according to the invention;

FIG. 9 shows a schematic representation of a simple loop;

DETAILED DESCRIPTION OF THE INVENTION

Figure 1:
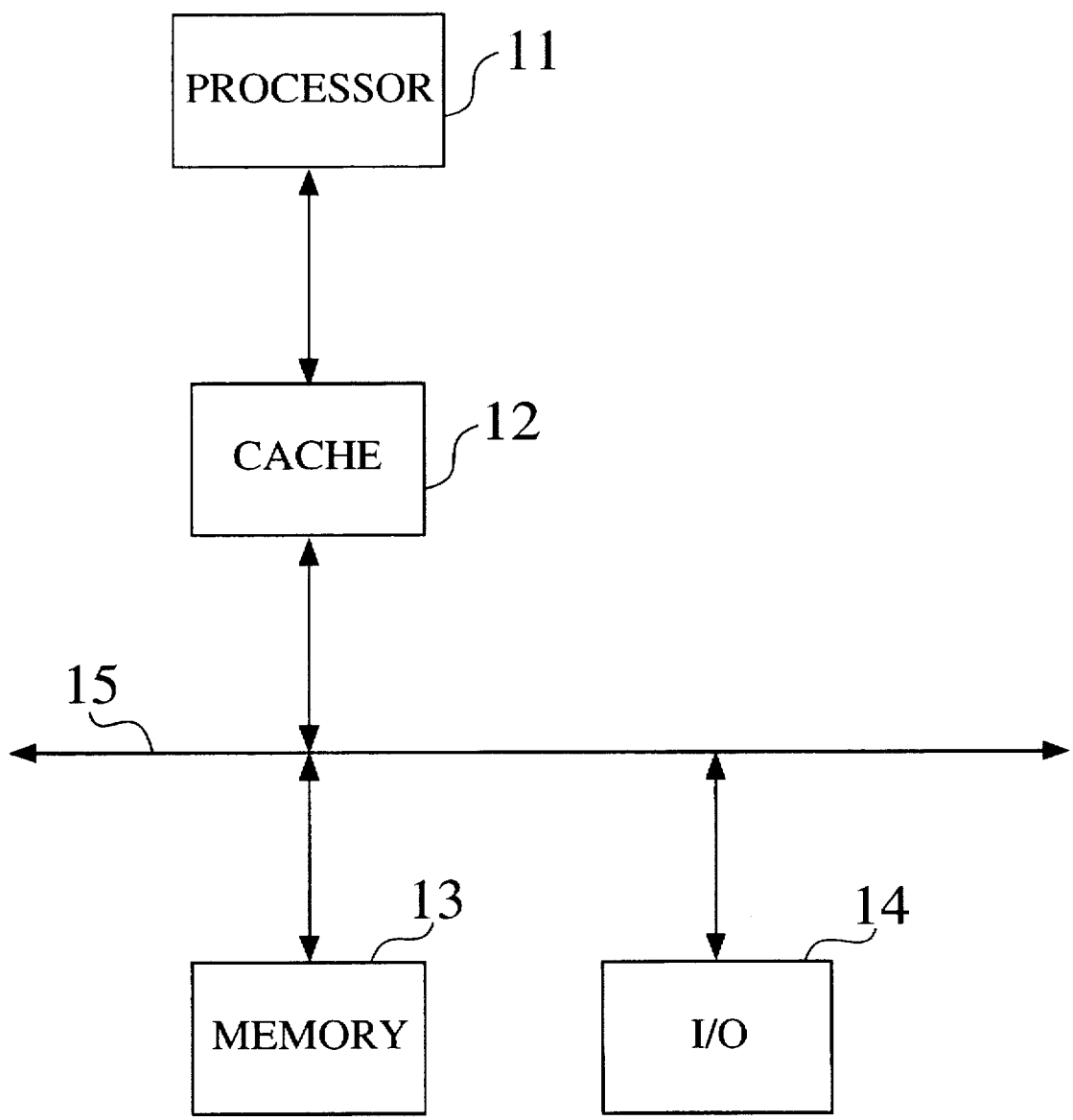
FIG. 1 shows a block schematic diagram of a uniprocessor computer architecture including a processor cache.

The invention provides a new compiler that features smart unrolling of loops.

The invention provides a prefetch driver 34 that operates in concert with such known techniques. The following discussion pertains to the various elements of the low level optimizer shown on FIG. 2b:

Local optimizations include code improving transformations that are applied on a basic block by basic block basis. For purposes of the discussion herein, a basic block corresponds to the longest contiguous sequence of machine instructions without any incoming or outgoing control transfers, excluding function calls. Examples of local optimizations include local common sub-expression elimination (CSE), local redundant load elimination, and peephole optimization.

Global optimizations include code improving transformations that are applied based on analysis that spans across basic block boundaries. Examples include global common sub-expression elimination, loop invariant code motion, dead code elimination, register allocation and instruction scheduling.

Loop invariant code motion is the identification of instructions located with a loop that compute the same result on every loop iteration and the re-positioning of such instructions outside the loop body.

Register allocation and instruction scheduling is the process of assigning hardware registers to symbolic instruction operands and the re-ordering of instructions to minimize run-time pipeline stalls where the processor must wait on a memory fetch from main memory or wait for the completion of certain complicated instructions that take multiple cycles to execute (eg. divide, square root instructions).

One important phase of the compiler identifies loops and access patterns to estimate how many cycles are devoted to loop iterations. In the invention, the compiler translates the higher level application code into an instruction stream that the processor executes, and in the process of this translation the compiler unrolls loops.

The longer unrolled loops allow the compiler to provide several advantages, such as:

1) It eliminates the extra branch exits. This saves CPU cycles by not having to execute the branch instructions and also helps reduce branch misprediction. Why this is important is evident if one considers most modern RISC architectures. These architectures have a long pipeline that is fed by an instruction fetch mechanism. When the fetch mechanism encounters a branch, it tries to predict if the branch is going to be taken or not. It then fetches instructions based on this prediction. The prediction is necessary to keep the pipeline from stalling. If the architecture's prediction is correct (this is determined when the branch instruction completes execution which is a few cycles after it has been fetched), then everything works fine; else all the instructions that have been fetched after the branch are discarded and the new instructions fetched based on the correct outcome of the branch. This penalty of discarding fetched instructions and fetching new ones, when the branch is mispredicted, is known as the branch misprediction penalty and it is very significant for most modern architectures. It is of the order of 5–10 cycles per branch instruction that is mispredicted. By reducing the branch instructions, the number of branches that get mispredicted automatically reduces.

2) It can better insert prefetches and effect other optimizations into the longer inner loop code. When the loop is unrolled, there are more memory instructions in the loop and also the memory stride (the distance between the memory accesses of an instruction in two consecutive iterations) is bigger. If a loop is unrolled four times, the memory stride goes up by four. This helps the prefetch to do a more effective job. When the memory stride increases, as long as it is less than the cache line size (which is architecture dependent), the prefetches become more effective. When the memory stride becomes greater than the cache line size the prefetches can hurt. Hence the loops should be unrolled such that the memory stride is lesser than the cache line size whenever prefetch instructions are going to be generated for the loop and whenever possible.

Figure 10:
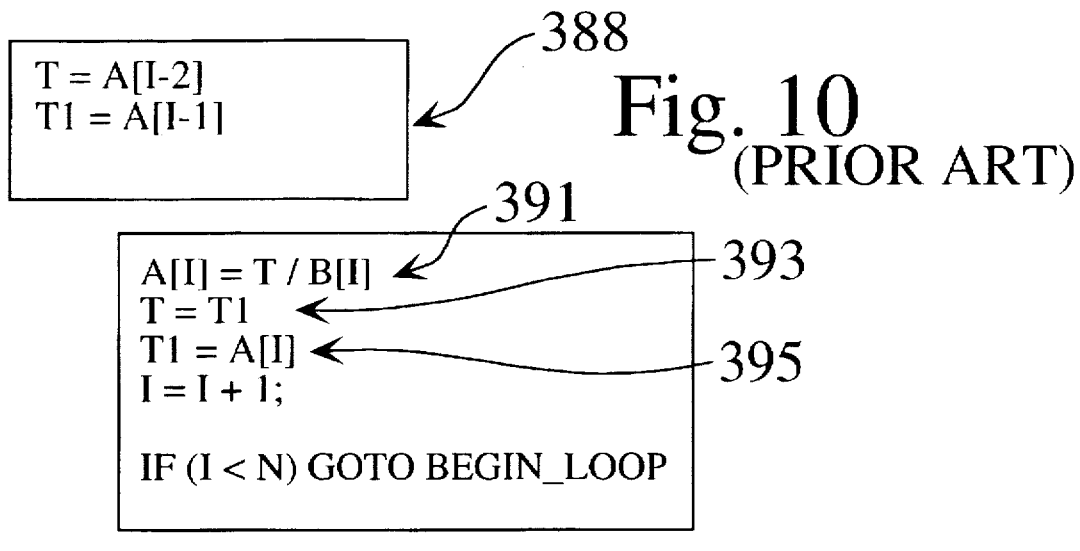
FIG. 10 shows the loop of FIG. 9 with scalar replacement according to the prior art.
Figure 11:
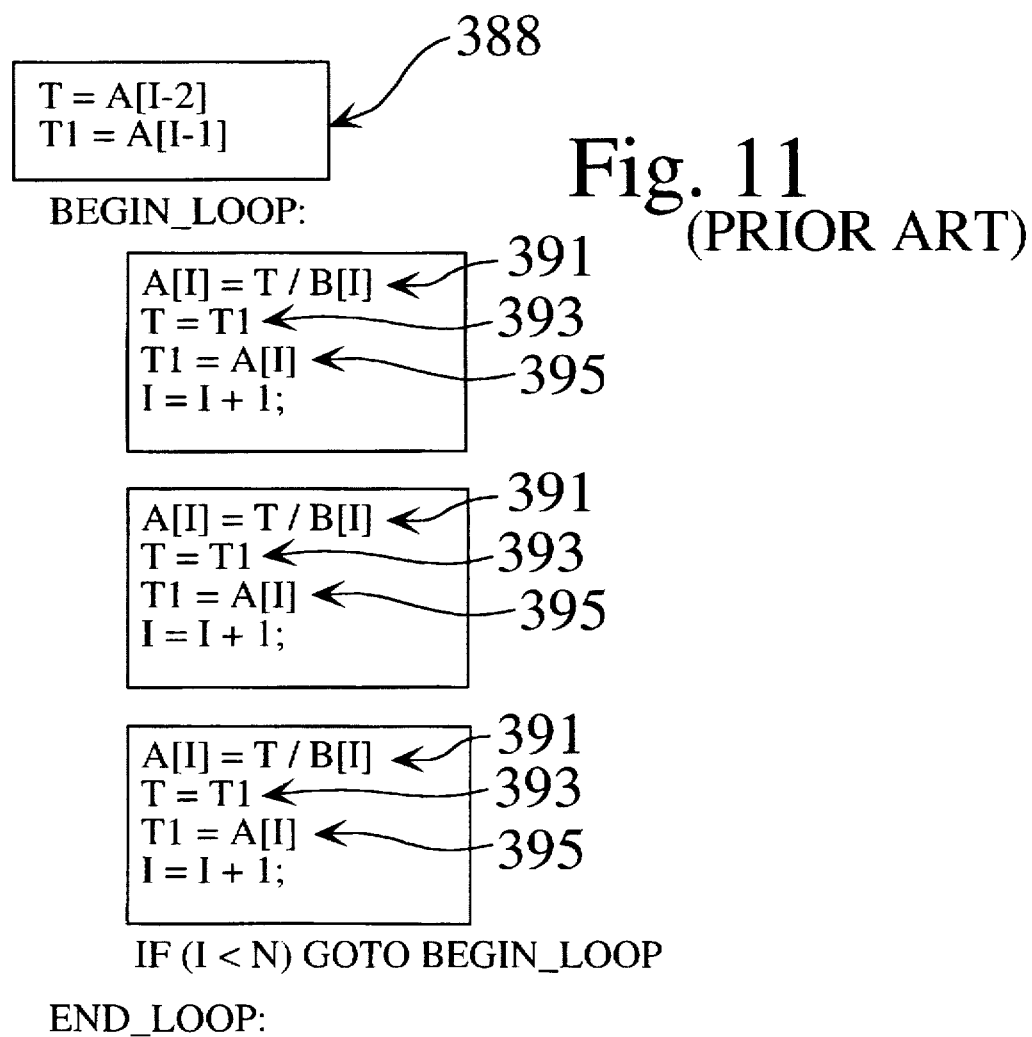
FIG. 11 shows the loop of FIG. 10 unrolled.

3) Scalar replacement/recurrence elimination inserts copies at the loops to keep the value of a variable live in the next iteration (see, for example FIGS. 9, 10, and 11). These copies can be eliminated by unrolling the loop a certain number of times.

4) Longer sequences of non-branching instructions can achieve an overlap between instructions that have nothing to do with memory and those that do. This is known as instruction scheduling and explained below. While the access time between the processor and the cache is typically 1 to 5 cycles, the retrieval time from cache to memory is often on the order of 10 to 100 cycles. When the processor actually gets to the point where the data item is needed from memory, if the data is not in cache, it might take 100 processor cycles to fetch it from main memory. Where the compiler can optimize the longer inner loop code, it may only be necessary to wait for 20 cycles because 80 cycles worth of look up time is hidden or overlapped with the execution of other instructions.

Loop unrolling is integrated with other low level optimization phases, such as the prefetch insertion algorithm, register reassociation, and instruction scheduling. The new compiler yields significant performance improvements for some industry-standard performance benchmarks, for example on the SPEC92 and SPEC95 benchmarks on the Hewlett-Packard Company (Palo Alto, Calif.) PA-8000 processor.

The following discussion explains compiler operation in the context of a loop within an application program. Loops are readily recognized as a sequence of code that is iteratively executed some number of times. The sequence of such operations is predictable because the same set of operations is repeated for each iteration of the loop. It is common practice in an application program to maintain an index variable for each loop that is provided with an initial value, and that is incremented by a constant amount for each loop iteration until the index variable reaches a final value. The index variable is often used to address elements of arrays that correspond to a regular sequence of memory locations.

In the compiler, it has been found that the low level optimizer component of a compiler is in a good position to deduce the number of cycles required by a stretch of code that is repetitively executed and this information can be used to determine the optimal unroll factor. As discussed above, the concept of loop unrolling is not new, but use of smart unrolling is new. For example, FIG. 4 shows the loop of FIG. 3 after the loop has been unrolled four times. Thus, instead of executing the loop 100 times if N were 4, the loop is executed 25 times.

Figure 5:
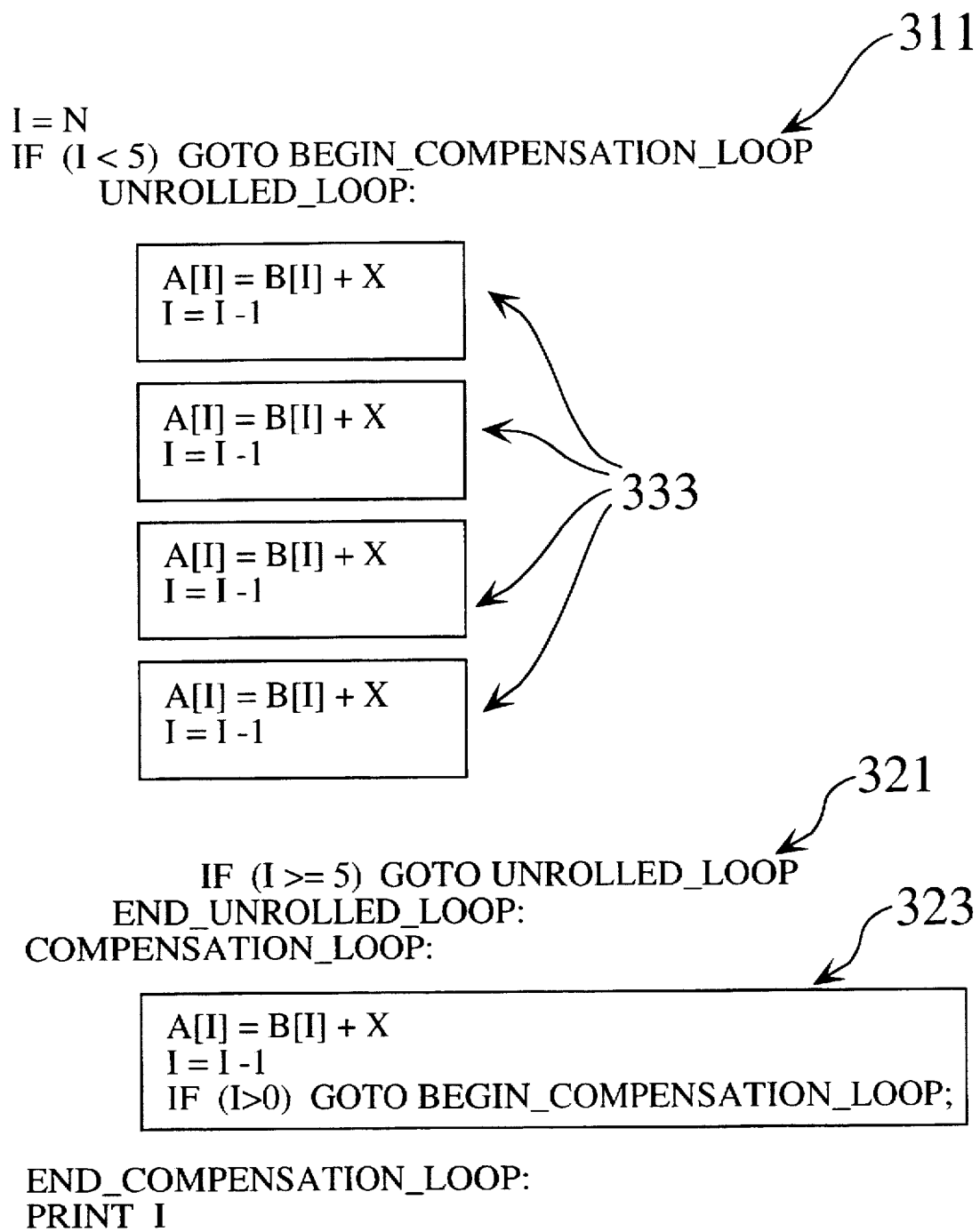
FIG. 5 shows the loop of FIG. 3 unrolled according to the invention and having an eliminated branch.

FIG. 5 shows the output code that is generated by the invention in contrast to the code generated by the prior art, as shown on FIG. 4. The replicated inner loops 333 are the same. Also, the compensation loop 323 is the same as the prior art compensation loop 155 of FIG. 4. However, the loop test at 301 and 159 of FIG. 4 now tests to exit if I>=5 rather than I>=4, as can be seen at 311 and 321 of FIG. 5. The effect is to ensure that the compensation loop is always executed at least once. This eliminates the need to test for the zero case (303 in FIG. 4). This eliminates the branch instruction 303 on FIG. 4. As indicated above, the elimination of this branch instruction significantly increases the speed of the compiled code by reducing the number of branch instructions that get mispredicted.

It is also possible to put the compensation code in front of the main loop, as is shown on FIG. 6. Here the compensation loop 383 is in front of the repetitive unrolled loops 347. In the general case, putting the compensation code before the main unrolled loop is less efficient than putting afterwards, because calculating the loop trip count requires a remainder operation which involves high latency divide operations.

However, if the unroll factor is a power of two, as in this case where the unroll factor is 4, the remainder calculation is a simple shift operation. Because unroll factors of 2, 4, or 8 are common, the compensation code can be placed in front in front of the unroll loop for negligible cost. As a practical matter, it is often advantageous to put the compensation loop in front of the unrolled loop to benefit from other optimizations such as register reassociation. When the compensation loop is placed before the unrolled loop, the variable that keeps track of the iteration count is not always needed after the unrolled loop. When the compensation loop is placed after the unrolled loop, this variable is always needed after the unrolled loop as there is an exposed use in the compensation loop. This exposed use can inhibit aggressive register reassociation. In the preferred embodiment, the architecture of the computer and the interactions with other optimizations dictate an unroll factor, and if it is a power of two, the compensation code is inserted in front of the unroll loop.

Another optimization technique that is part of the invention herein disclosed rearranges loops with early exits (which are henceforth referred to as WHILE loops). These loops are characterized by the fact that some of the inner loop code is done before the loop test, and some after the loop test as is shown on FIG. 7a. Here the loop has an exit branch 403 in the middle with inner loop operations 401 before it, and other inner loop operations 405 after it.

Figure 7B:
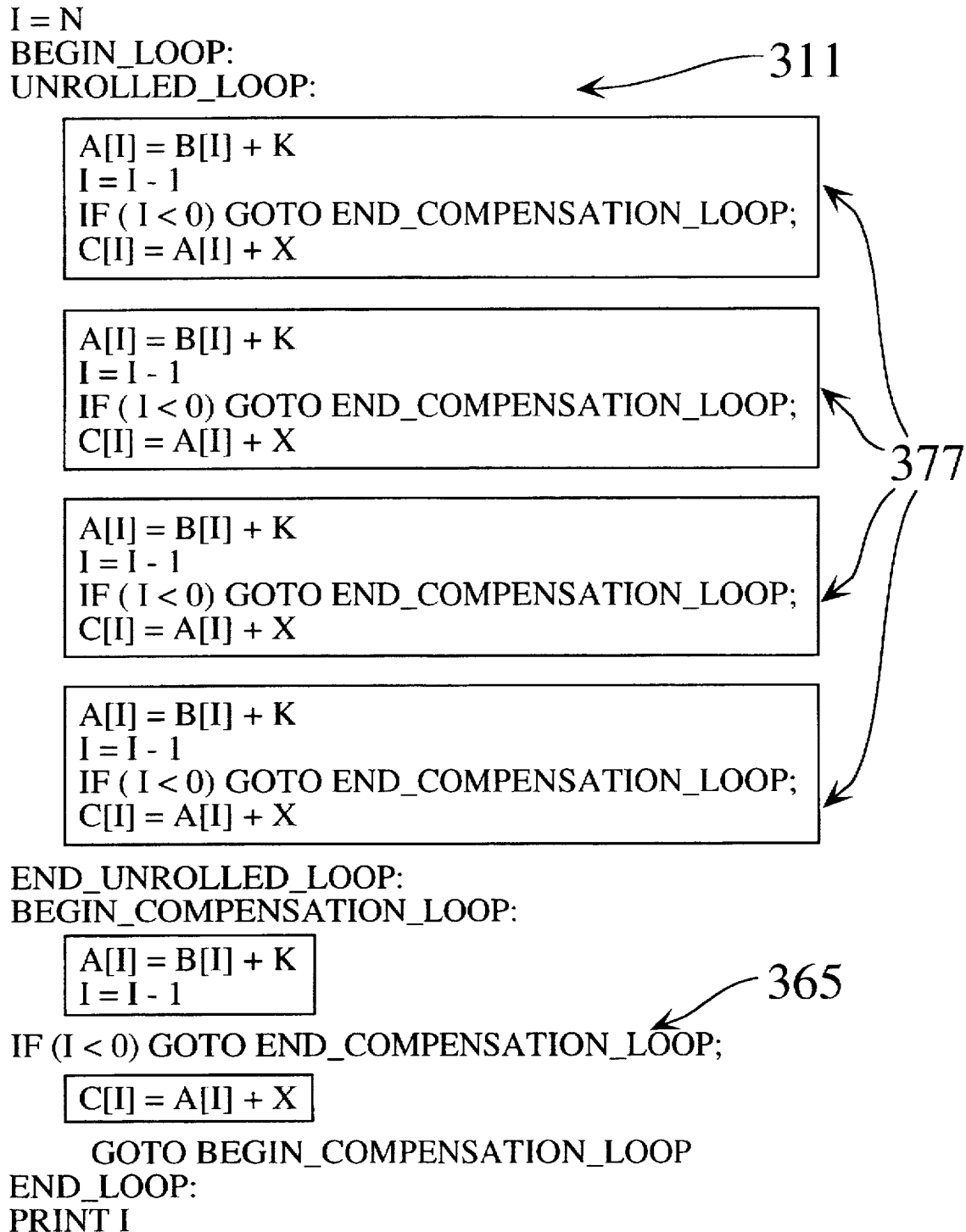
FIG. 7b shows the WHILE loop of FIG. 7a that has been unrolled according to the prior art.

The optimization taught in the prior art for this loop is shown on FIG. 7b. Notice that the whole inner loop, including the exit instruction, is replicated 377 four times. This can be improved by converting the unrolled loop into a FOR loop with an exit condition of (unroll factor +1) as opposed to unroll factor (e.g. 5 instead of 4 in this case), as is shown on FIG. 8. This guarantees that the unrolled loop is exited before it would have to exit due to the WHILE condition. Because none of the branches at 377 on FIG. 7b are executed, the WHILE exit instruction can be removed, as is shown at 319 on FIG. 8. Thus, there is only one place that there is a WHILE loop exit, i.e. at 365.

The technique herein disclosed ensures that the unrolled loop exits before it would take any of the WHILE loop exits, so that the WHILE test can be removed from the unrolled loop. It is necessary to ensure that the compensation code is always executed at least once.

The following discusses how the unroll factor interacts with the scalar replacement optimization. This is particularly important because the form of this optimization determines the unroll factor. Consider the loop shown on FIG. 9. Notice that the value of A[I] stored in the inner loop at 367 is loaded again two loop iterations later, when the same statement loads A[I-2] with a value of I which is incremented by 2. The idea behind scalar optimization which is well known in the prior art, is to save array values in temporary variables if they are accessed shortly within the next few iterations. Thus, the loop can be modified as is shown on FIG. 10.

Here, the array reference A[I-2] at 391 is replaced with T, and it is followed by two instructions at 393 and 395 which assign values to T and T1. Two scalar temporary variables are necessary because the value of the two most recent array values must be saved. The value of A[I-1] would have been stored in the previous iteration in T1 and that is going to be used in the next iteration. We move T1 to T and T will be accessed in the next iteration. Similarly T1, to which A[I] is assigned will be moved to T in the next iteration and used 2 iterations from now.

The instruction at 395 appears to make an indexed reference to the array A and that suggests that an array access must be made to get the number to put into T1, which would be a high latency operation and would lose all that was gained by the optimization. What actually happens is the optimizer recognizes that the value of A1 is stored two instructions earlier at 391, and that A[I] is resident in a register which can be stored into T1 without accessing A[I]. As T1 is likely to be assigned to a register, this operation is a register to register instruction.

The foregoing illustrates how the various optimization techniques are interrelated allowing the loop unrolling optimizer to generate code which is clearly not optimal in itself but is optimized by other optimizers in the compiler. Initialization code is inserted at 388 to define initial values of T and T1.

FIG. 11 shows how such a loop can be unrolled according to the prior art if an unroll factor of three had been chosen. The prior art does not specify the selection of an unroll factor of three here, but a factor of three, or a multiple of three is optimal because it allows other parts of the optimizer to generate the code shown on FIG. 12. The selection of an unroll factor here of three or a multiple of three is important because three values of the array must be kept A[I], A[I-1] and A[I-2] if the array references are to be avoided.

Figure 12:
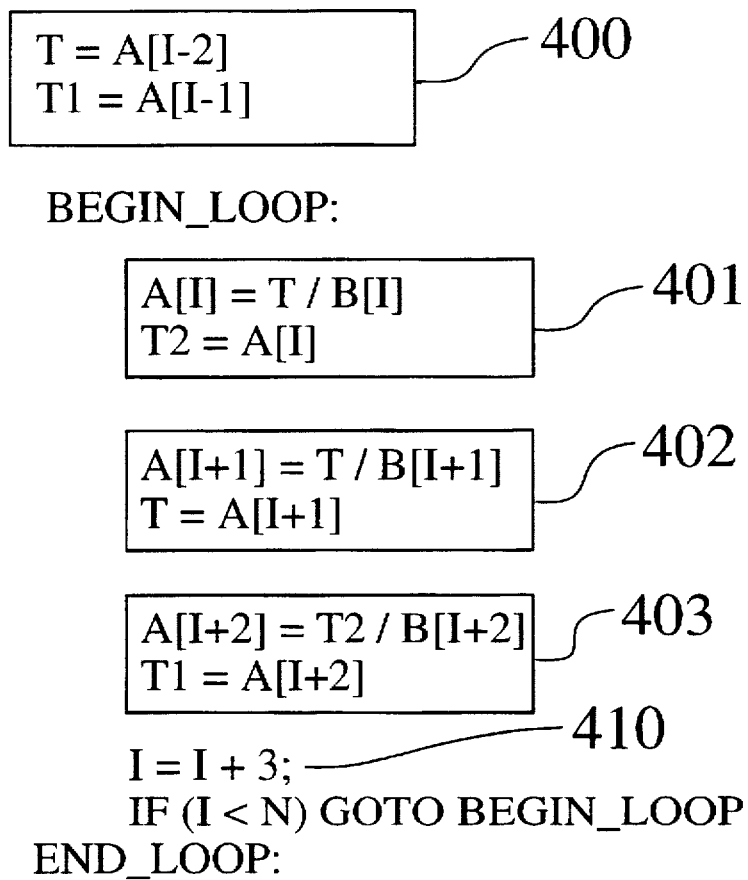
FIG. 12 shows a schematic representation of the loop of FIG. 11 after copy elimination.

Three variables T, T1 and T2 are used, making it possible for other well known code optimization techniques to generate code, such as that shown on FIG. 12. This eliminates shuttling the temporary data from T to T1. This is an example of where the nature of the code in the loop and its effect on scalar optimization forces a particular unroll factor. In general, one lists the various indexes in the loops and sorts them to notice the maximum distance between them.

In the above case the distance between the index I, and I-2, is 2. Adding one to this value computes a primary unroll factor, which is three in this case. This is an acceptable unroll factor. However, if it turned out to be very small, one might want to multiply it by a constant to get a larger unroll factor. Alternatively, if the primary unroll factor was very large, one might want to divide it by the loop increment of it was a number other than one. The reasons for selecting a particular unroll factor are discussed below.

Determining the unroll factor.

Classically the prior art uses a standard unroll factor for all loops. Typically the number used is four. In the invention, the unroll factor is calculated for each loop depending on various factors. At one extreme some loops are not unrolled at all, and other loops are unrolled eight or even more times. The disadvantages of picking too large an unroll factor are:

1. All the loop instructions need not fit into the instruction cache leading to a lot of I-cache misses.
2. The higher the unroll factor, the higher the memory stride of memory instructions across iterations. If the memory stride exceeds cache line size, the effectiveness of prefetch decreases.
3. The resulting code is longer. Usually an upper bound must be chosen, an unroll count of 1000 is not likely to be a good idea since the compile time can go up significantly. Also excessive unrolling can adversely affect other optimizations which have bounds on the number of transformations they can make.

On the other hand if a small unroll factor is chosen the following problems can occur:

1. Much more time is spent executing the high latency branch instruction which closes the loop.
2. The short inner loop provides many fewer opportunities for optimization than longer inner loops. Where the inner loop has high latency instructions, the compiler can often have them execute in parallel with low latency time instructions. This may not be possible in very short loops.

One must keep in mind that the compiler is compiling loops that range from single instruction inner loops to loops that have scores or even hundreds of instructions, and so the compiler must compile code balance these considerations to achieve good unroll factors. To determine the unroll factor, the compiler considers the following in decreasing order of importance:

1. There is a maximum value of the unroll factor (which in the preferred embodiment of the invention is eight).
2. The number of instructions in the unrolled loop must not exceed a specific limit. This provides another upper bound to the unroll factor.
3. If there are references to previous indexed contents of the array such as was shown in FIGS. 10 through 12, an unroll factor suggested by this analysis (or a multiple of it) should be used.
4. If prefetch instructions are being generated (this is known based on a user defined flag), then try to pick an unroll factor that keeps the value of the strides of array references within the loop below the cache line size.
5. If the trip count is a constant known at compile time, then an unroll factor that eliminates the need for a compensation code loop should be selected. Typically this would be an unroll factor of 2, 4 or 8, although other numbers such as 3 or 5 might be possible.
6. If there is profile information, use that. If the profile informations says that the loop iterates on an average $k'$ times, if $k'$ is smaller than the maximum value of the unroll factor as dictated by the previous steps, use $k'$, else use the maximum value of the unroll factor.
7. If there are high latency operations within the loop such as divide and square root operations, use an unroll factor that will enhance the maximum overlap of these instructions. For instance, if the architecture has two divide units and the loop has a single divide instruction, the loop should be unrolled an even number of times so that both the divide units can be kept simultaneously busy.

The algorithm that computes the unroll factor tries to compute an optimal and acceptable unroll factor. The cost of a nonoptimal unroll factor is slower run time code. As discussed above, the algorithm is sensitive to profile data, number of instructions in the loop, architecture features like functional units and cache line size, interactions with other optimizations and constant trip counts.

Figure 13:
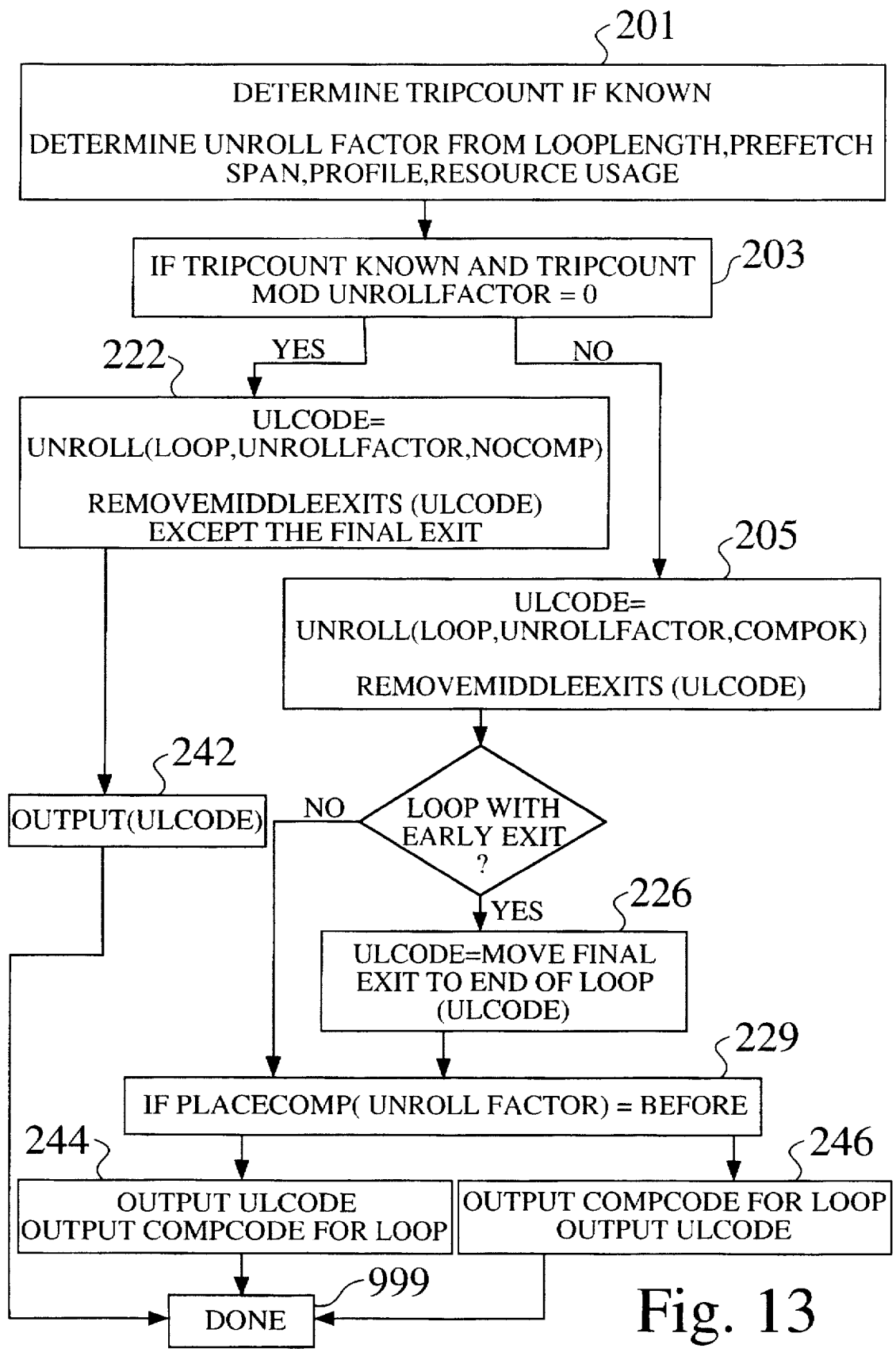
FIG. 13 shows a schematic representation of the compiler logic which determines the unroll factor, compensation code placement, and other optimizations.

Attention is directed to FIG. 13, which shows how the optimization algorithms presented here are implemented. At 201 the unroll factor is determined as described above. Next, at 203, a check is made for the special case where the trip count is known at compile time and is a multiple of the unroll factor. In this case, the unrolled loop code is generated from the original loop code, any middle exits are removed leaving only the final exit, and the unrolled code is output at 242. Because this is an unrolled loop which needs no compensation code, none is output. The other exit occurs at 203 where the trip count is not known at compile time, or the trip counts and unroll factor are such that compensation code must be generated. Control goes to 205 where the unrolled code is generated. For non-WHILE loops, the middle exits are removed leaving only the final exit. For a WHILE loop, the final exit is moved to the end of the loop (226) instead of the middle and all other exits removed. At this time a determination (at 229) is made using the unroll factor to determine if the compensation code should be output before or after the unrolled loop code. If it should be after, control goes to 244, otherwise control goes to 246. All of these three control paths then meet at 999, terminating the unrolling optimization.

Figure 2A:
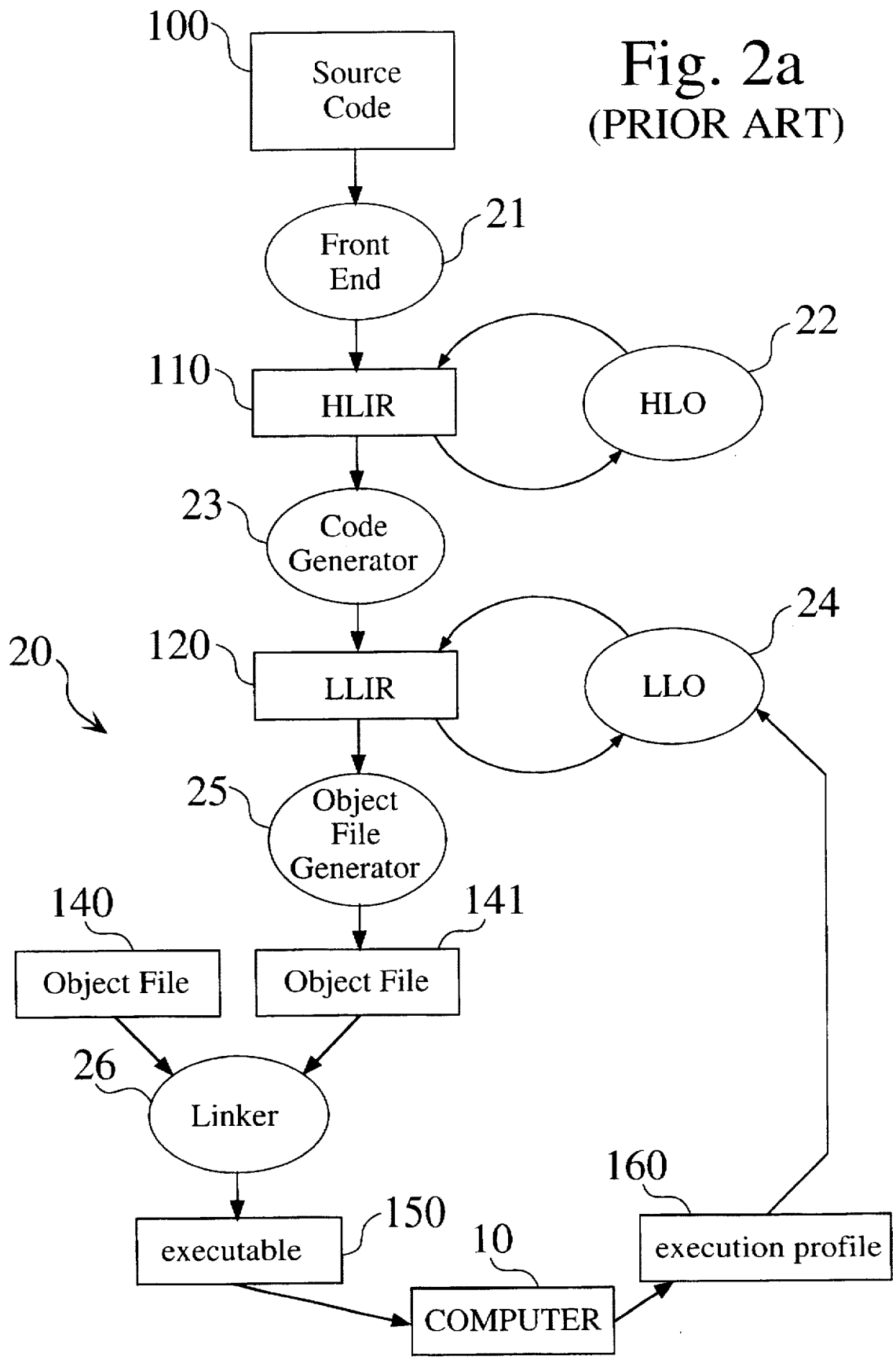
FIG. 2a shows a block schematic diagram of a modern software compiler.
Figure 2B:
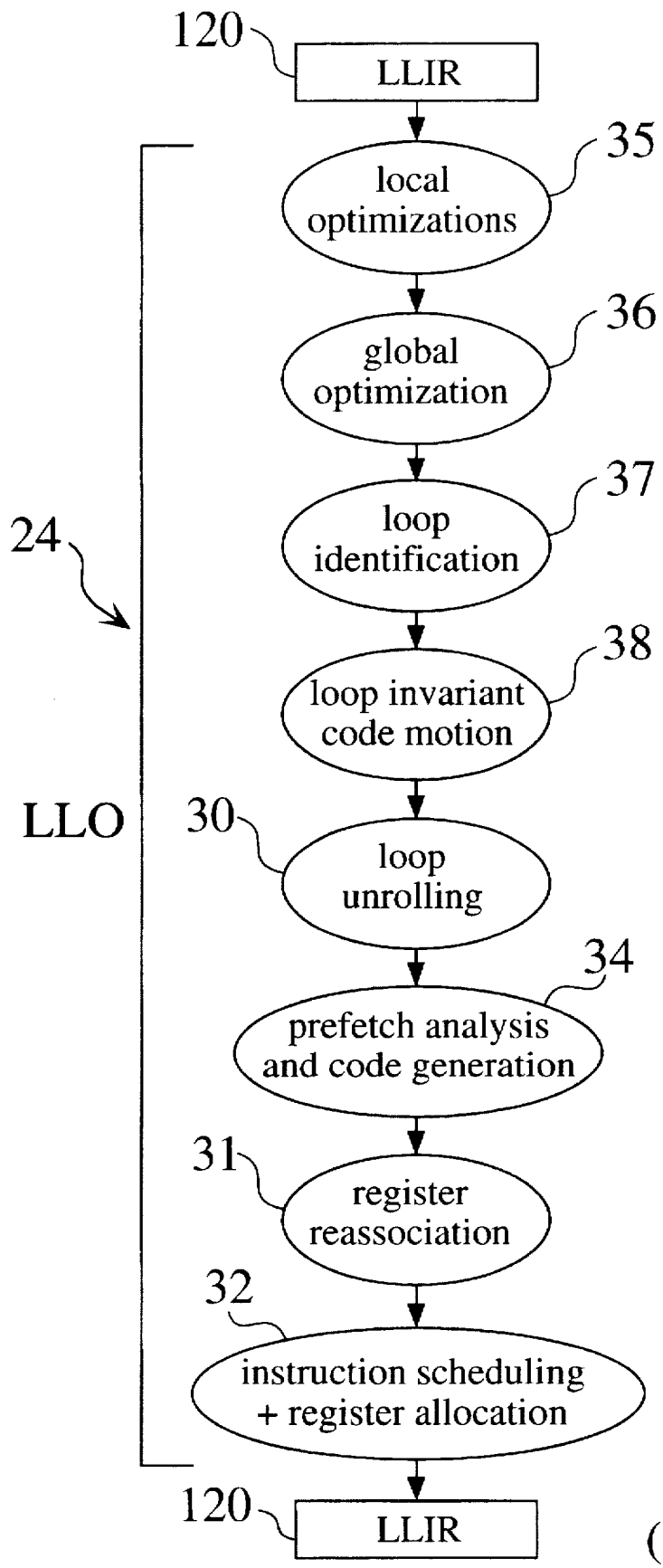
FIG. 2b shows schematic diagram of the low level optimizer.
Figure 14:
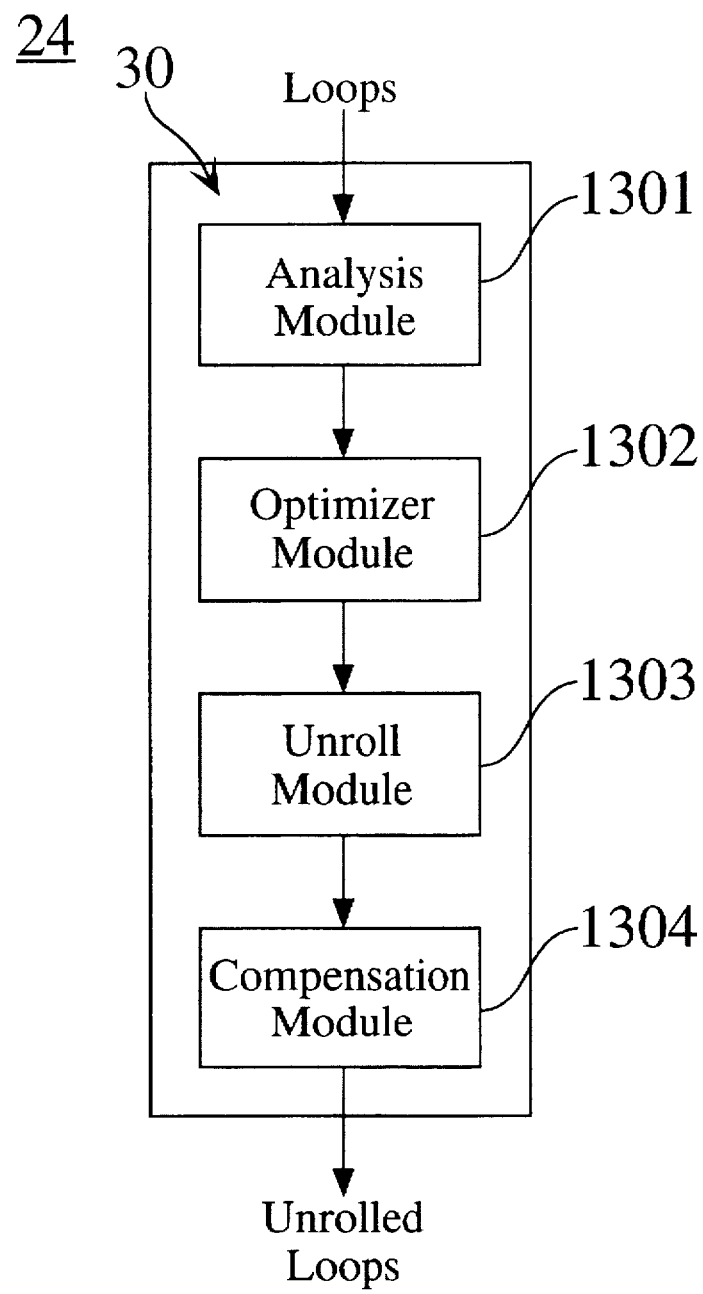
FIG. 14 is a block schematic diagram of a compiler for a programmable machine in accordance with the invention.

FIG. 14 is a block schematic diagram of a compiler for a programmable machine in accordance with the invention. The compiler of FIG. 2b shows a loop unrolling module 30. The preferred embodiment of the invention provides a loop unrolling module that is placed within the compiler as shown in FIG. 2b. As shown in FIG. 14, the compiler comprises an analysis module 1301 for analyzing and unrolling loops within source applications. An optimizer module 1302 determines an optimum unroll factor in response to the analysis module. An unroll module 1303 generates an unrolled loop having said optimum unroll facto, while a compensation module 1304 generates and places any compensation code as required as a result of loop unroll optimization.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. In a programmable machine, a compiler comprising:
   an analysis module for analyzing and unrolling loops within source applications;
   an optimizer module for determining an optimum unroll factor in response to said analysis module;
   an unroll module for generating an unrolled loop having said optimum unroll factor; and
   a compensation module for generating and placing any compensation code as required as a result of loop unroll optimization,
   wherein said compensation module performs a placement calculation to determine whether to put said compensation code before the unrolled loop or after the unrolled loop.

2. The compiler of claim 1, wherein said compensation module ensures that said compensation code is executed at least once when said unrolled loop is executed.

3. The compiler of claim 1, wherein said unroll factor is responsive to a number of instructions in the loop.

4. The compiler of claim 1, wherein said unroll factor is responsive to resource usage within the loop.

5. The compiler of claim 1, wherein said unroll factor is responsive to prefetch distance of memory references within the loop.

6. The compiler of claim 1, wherein said unroll factor is responsive to profile information collected from previous executions of compiled code.

7. The compiler of claim 1, wherein said unroll factor is responsive to recurrence of memory references within the loop.

8. The compiler of claim 1, wherein said unroll factor is responsive to the number of instructions in the loop.

9. The compiler of claim 1, wherein a trip count for the loop is known at compile time, and wherein said optimizer module determines an unroll factor that executes the compensation code zero times and suppresses the generation of said compensation code.

10. The compiler of claim 1, wherein said placement calculation is responsive to the unroll factor computed for the loop.

11. The compiler of claim 1, wherein said loop is a loop having an early exit.

12. The compiler of claim 1, wherein loop unrolling is integrated with other low-level optimization phases.

13. The compiler of claim 12, wherein said other low-level optimization phases include any of prefetch instruction insertion, register reassociation, and instruction scheduling.

14. A method for unrolling loops, comprising the steps of:
   determining a unroll factor;
   generating an unrolled loop which always exits leaving a remaining trip count of at least one;
   generating compensation code;
   determining whether the compensation code should be placed before the unrolled loop or after the unrolled loop; and
   determining if the trip count is a power of two; and if it is placing the compensation code before the unrolled loop.

15. The method of claim 14, wherein the loop to be unrolled is a loop having an early exit.

16. The method of claim 15, wherein the loop having an early exit after unrolling is transformed into a loop having an exit at its end, and from which all intermediate exits have been removed.

* * * * *